United States Patent [19]

Chambers

[11] Patent Number: 4,881,061
[45] Date of Patent: Nov. 14, 1989

[54] ARTICLE REMOVAL CONTROL SYSTEM

[75] Inventor: David C. Chambers, Saint Paul, Minn.

[73] Assignee: Minnesota Mining and Manufacturing Company, Saint Paul, Minn.

[21] Appl. No.: 279,531

[22] Filed: Dec. 5, 1988

[51] Int. Cl.⁴ ............................................... G06F 7/06
[52] U.S. Cl. ................................... 340/568; 340/522;
340/572; 340/825.31; 340/825.32
[58] Field of Search ........... 340/572, 568, 522, 825.31, 340/825.32

[56] References Cited

U.S. PATENT DOCUMENTS

| | | | |
|---|---|---|---|
| 3,665,449 | 5/1972 | Elder et al. | 340/572 |
| 4,141,078 | 2/1979 | Bridges, Jr. et al. | 364/900 |
| 4,595,922 | 6/1986 | Cobb et al. | 340/568 |
| 4,661,806 | 4/1987 | Peters et al. | 340/568 |

Primary Examiner—Glen R. Swann, III
Attorney, Agent, or Firm—Donald M. Sell; Walter N. Kirn; Peter Forrest

[57] ABSTRACT

A system for controlling removal of articles from a facility by authorized users transmits data to, and receives data from, an article inventory control system and an electronic article surveillance system, either or both of which may be pre-existing. The inventive system comprises a terminal which identifies the user and article, transmits the user and article identification data to the article inventory control system, receives article removal authorization data from the article inventory control system, verifies the identity and number of articles to be removed, and enables the user to remove the article through the electronic article surveillance system. The preferred embodiment is adapted for a library, and is designed to provide library patrons with the ability to check books out of the library without staff assistance.

14 Claims, 4 Drawing Sheets

ARTICLE REMOVAL CONTROL SYSTEM

TECHNICAL FIELD

This invention relates to a system for controlling removal of a specifically identified article from a facility by a specifically authorized user.

BACKGROUND

Article inventory control (AIC) systems, in general, authorize, track, and control movement of a given article within a facility by a given user. An example is a library circulation control system. In this case, a user could identify himself or herself with an identification card containing magnetically or optically detectable data (e.g., a barcode). The articles, books in the collection of the library, typically would have a similar identifying label. Usually a computerized user database contains identification data on all registered patrons of the library, and a similar article database contains identification data on all books in the library. When someone desires to remove a book from the library, the library circulation control system will first verify that the person is an authorized patron of the library, i.e., that the person is authorized to check out any book, or any of a particular class of books. The system will then verify that the particular book may be removed from the library, e.g., that it is not "on reserve." If both the user and the book are authorized by the system, the book may be removed, ("checked out") by that user. This authorization is often a visual or audible signal to library personnel. Additionally, but not required, the system could maintain data which correlates the specific user with the specific books checked out, and may issue fine notices, usage reports, and the like.

To prevent unauthorized removal of articles by users of facilities, electronic article surveillance (EAS) systems may also be employed. An electronic article surveillance system is defined as a system which comprises:
(1) a remotely interrogatable marker attached to a given article;
(2) means for interrogating and sensing the marker within an interrogation zone, thereby determining presence of the article; and
(3) means for preventing removal of the article by a user of the facility.

For the purposes of this invention, the term "removal" is understood to include the ability of the user to gain access to an article, to move an article from one point to another within a facility, to bring an article into a facility, or to remove an article from a facility. The last of these is a common use of EAS systems. However, an EAS system as defined above can control, for example, the routing of articles from one portion of a factory assembly line to another.

Many EAS systems employ a magnetic "marker" attached to an article, with appropriate marker interrogation and sensing apparatus located at one or more locations in the facility. Typically, removal of an article is prevented by restricting movement of the article within or from the facility, as with a lockable exit gate. The gate is locked in response to an alarm signal when a marker is detected within an interrogation zone located immediately before the exit. In the library example used above, the marker may comprise a piece of magnetic material adapted to be inserted in the book spine or attached inside the book cover.

Typically, EAS systems employ permanently or reversibly deactivatable markers and the apparatus associated with them. Such markers are also known as "dual status" markers. Permanently deactivatable markers are preferred where it is appropriate in certain circumstances for an article to pass through the interrogation zone without preventing removal. For example, in a retail store, if an article of merchandise has been purchased in a particular department, the marker may be deactivated at that point so that an interrogation zone in another department will not activate the marker. Reactivatable markers are appropriate, for example, in libraries where patrons who check out a book for an extended period of time may subsequently visit the library with that book during that period. In this case, the system should not prevent subsequent removal of the book until the book has been returned, the marker reactivated, and the book returned to circulation.

Integration of the functions of the two systems described above into a single system is known in the art. For example, U.S. Pat. No. 3,665,449 (Elder et al.) at column 15, lines 62-67 generally suggests that automated library checkout systems may be combined with EAS systems. More specifically related to the present invention, U.S. Pat. No. 4,141,078 (Bridges, Jr. et al.) discloses an automated library circulation control system which provides for patron identification via a card reader, book identification via an optical reader, modification and interrogation of computer data files, an electromagnetic device for magnetizing and demagnetizing a magnetic strip in each book, detection of unauthorized removal of books from the library, and other functions. The disclosure of U.S. Pat. No. 4,141,078 (Bridges, Jr. et al.) is incorporated by reference into this application.

Application of this type of integrated system may be difficult, especially in libraries in which one or both of the individual systems are in current operation. For example, some existing EAS systems cannot distinguish individual markers, only whether a sensitized marker is present. Thus a single library might employ markers which are identical, even on different types of books in the collection. The marker therefore may not already contain coded inventory data which could identify the type of article to which it is attached. A library with such an EAS system in place, but no computerized inventory control system, would have to add a unique inventory control marker to each book. Each book generally must be uniquely identified, including the identification of multiple copies of a single title, some of which may be in general circulation while one is on reserve.

Furthermore, present EAS systems generally are not designed to receive removal authorization signals from AIC systems added later. Thus, for complete article removal control in such a facility, it is necessary to have separate article inventory control and article surveillance systems, and usually a manual, labor intensive, connection between the two. In a library, such a connection might be a circulation clerk who, seeing a flashing light on the AIC system indicating book removal authorization, physically passes a book through a marker deactivation device of the EAS system. Another possibility is for the circulation clerk to manually bypass the removal prevention means, e.g., physically passing the book around the interrogation device and handing the book to the patron on the other side of the lockable gate. Since the patron would pass through the interrogation zone without any marked books, the gate would remain unlocked and thus allow the patron to exit the library.

SUMMARY OF THE INVENTION

The invention is an article removal control system for enabling removal of a given article only by a given authorized user from a facility which has:
  (a) an article inventory control system which responds to inputs including user identification data and article identification data to issue an article removal authorization signal, and
  (b) an electronic article surveillance system which controls removal of the article by detecting within an interrogation zone a sensitized electronically detectable marker secured to the article;
the article removal control system comprising:
  (c) an article removal authorization signal receiver and
  (d) means responsive to the article removal authorization signal for initiating removal of the given article, comprising
    (1) a measurer of a characteristic of the given article,
    (2) a receiver of a coded input signal representing the measured characteristic,
    (3) a comparer of the measured characteristic and the coded input signal, which produces a verification signal if they are substantially equal, and
    (4) an enabler which upon receipt of the verification signal enables the initiation of the removal of the given article.

DETAILED DESCRIPTION

FIGS. 1-4 are schematic diagrams in which major components of a preferred embodiment of the invention are located within a portion of a facility generally indicated as 100. Within the facility is at least one article 110, attached to which are an article identification code 220, an electronic article surveillance (EAS) marker 310, and an article characteristic code 460. The codes 220 and 460 could be parts of a single label, similar to a Universal Product Code (UPC) label.

Figure 1:
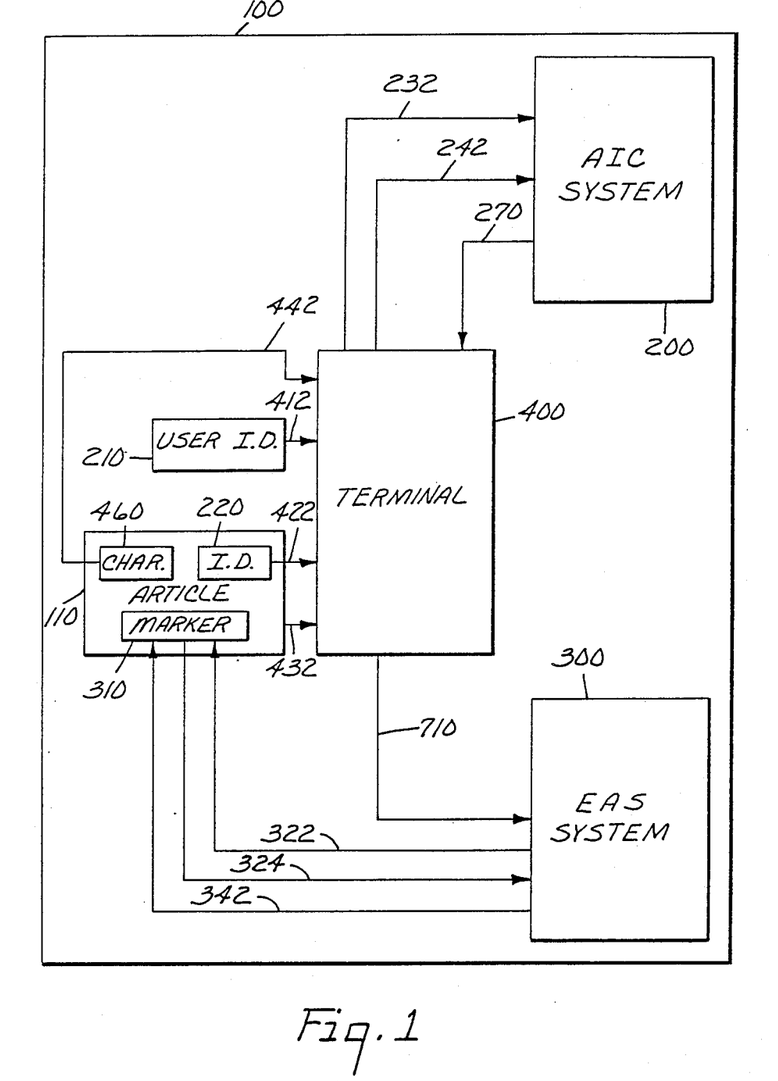
FIG. 1 is a schematic block diagram of a preferred embodiment of the invention and associated components.

The article inventory control (AIC) system 200 and electronic article surveillance (EAS) system 300 may exist within the facility prior to the installation of the inventive system, or may be installed at or about the same time.

The AIC system 200 includes a user identification card 210. In general, this system identifies a user (not shown) through the user identification card 210, and similarly identifies the article 110 through the article identification code 220. The article identification code could be permanently affixed to the article itself, embedded or inscribed on the article, or affixed to a tag adapted to be attached to the article. The AIC system determines if the identified user is allowed to remove the identified article from the facility. If so, the AIC sends an article removal authorization signal 270 to the terminal 400. If not, removal of the article is prevented as described below. Other functions of the AIC system not required here, such as storage of the time and date of use, etc., may also be performed before the article removal authorization signal 270 is sent to the terminal.

The EAS system 300 interrogates the EAS marker 310 with interrogation signal 322, receives a sensed signal 324, and, upon receipt of a verified article removal authorization signal 710, allows the user to remove the article from the facility.

The inventive system comprises, in this preferred embodiment, at least one terminal 400. In general, the terminal 400 converts user and article identification data 412 and 422, respectively, into transmitted user and article identification signals 232 and 242, respectively, which are passed to the AIC system 200 for the identification of the user and article as described above.

Other inputs to the terminal 400 are an article characteristic measurement 432 and a coded article characteristic measurement 442. In the embodiment shown in FIG. 1, the source of the coded article characteristic measurement is the article characteristic code 460 attached to the article 110. The coded article characteristic measurement 442 is entered at the terminal by the user 120. This embodiment is preferred but not required; the coded article characteristic measurement 442 could be introduced to the terminal automatically in a manner similar to that used for the user or article identification data 412 or 422, respectively. The embodiment shown requires interaction between a user and the terminal 400, which can be used to improve the security of the total system.

The terminal compares the article characteristic measurement 432 with the coded article characteristic measurement 442. If the two agree (within suitable tolerances), it is presumably verified that the entire article 110, and only that article, is physically present at the terminal, and not just the article identification code 220 (which might have been removed from the article, if possible), or more than one article (which would produce a different article characteristic measurement 432). When both this agreement and the article removal authorization signal 270 are present, the terminal issues the verified article removal authorization signal 710 to the EAS system 300.

In this way, communication between the separate systems 200 and 300 is established. The result is that the EAS system permits a given article to be removed from the facility only by a given authorized user, as determined by the AIC system.

Signals 232, 242, and 270, however, present special difficulties. As stated earlier, many present AIC systems are not adapted to communicate with other systems to provide the benefits of this invention, especially if the AIC system is not designed and/or installed contemporaneously with an EAS system. As disclosed below, this invention utilizes existing AIC signals in the integration of AIC and EAS functions without requiring significant modifications to the AIC system or "hardwired" connections between the two systems. In order to disclose this, additional description of the AIC and EAS systems is useful.

Figure 2:
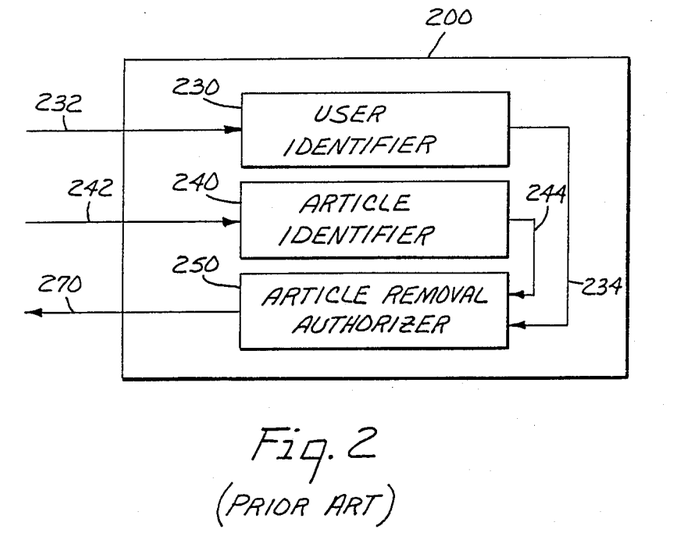
FIGS. 2 and 3 are detailed schematic block diagrams of components of FIG. 1.

FIG. 2 is a schematic block diagram of a typical prior art article inventory control system 200. As stated above, inputs to this system are the transmitted user identification signal 232, and the transmitted article identification signal 242. The output from the system is the article removal authorization signal 270. The transmitted user identification signal 232 is evaluated by a user identifier 230 (e.g., a database is searched), and a determination is made whether the user is known to the system. If so, a verified user identification signal 234 is issued to an article removal authorizer 250. Similarly, the transmitted article identification signal 242 is evaluated by an article identifier 240 (e.g., another database is searched), and a determination is made whether the article is known to the system. If so, an article identification signal 244 is issued to the article removal authorizer 250. The article removal authorizer 250 uses both verified identification signals 234 and 244 to decide if the user is authorized to remove the article from the facility. (Additional considerations, not shown, may include the time of day, number of previous removal requests by a given user in a day, and the like.) If so, an article removal authorization signal 270 is produced. If any of the evaluations, determinations, etc., above indicate an unauthorized user and/or unauthorized article, the article removal authorization signal 270 is not produced.

Figure 3:
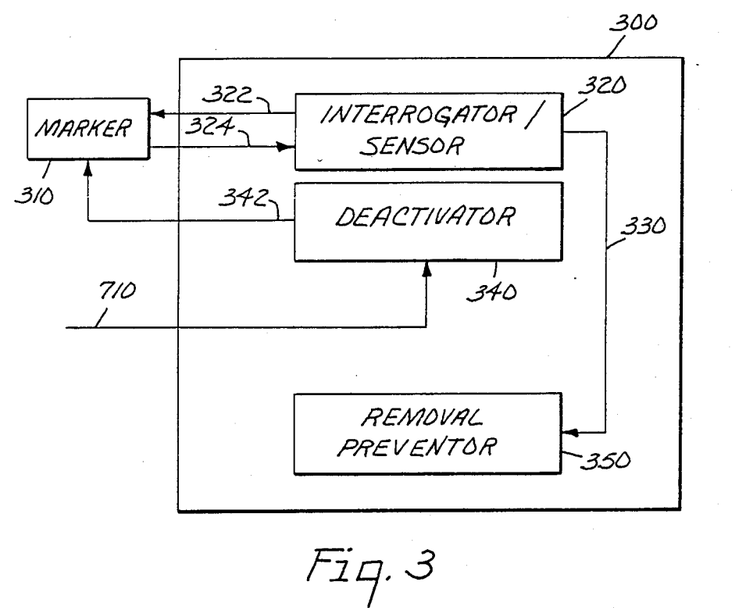

FIG. 3 is a schematic block diagram of a typical electronic article surveillance system 300, including modifications according to this invention. As stated above, this system sends the interrogation signal 322 to the EAS marker 310 and receives the sensed signal 324 from the EAS marker 310. It also receives the verified article removal authorization signal 710 from the terminal 400. Typically, the interrogation signal 322 results in an alternating magnetic field of known intensity and frequency in an interrogation zone. The sense signal 324 is induced as a result of the alternating magnetization in the marker in response to the interrogation signal 322, and comprises multiple harmonics of the interrogation signal. When an activated EAS marker 310 is interrogated and sensed by an interrogator/sensor 320, an activation status signal 330 is created. This signal is used by removal preventer 350 to decide if the article to which the activated marker is attached may be removed from the facility.

The embodiment shown in FIG. 3 is suitable for use with permanently deactivatable markers. Accordingly, the EAS system 300 further comprises deactivator 340, which receives the verified article removal authorization signal 710 The total system operates as described above, and additionally the receipt of signal 710 energizes the deactivator, which in turn emits deactivation signal 34 to the marker 310. Typically, deactivation signal 342 is a high intensity non-alternating magnetic field. Once marker 310 is permanently deactivated, sensed signal 324 will not be produced upon subsequent interrogation, and thus the activation status signal 330 will be the same as if no marker was sensed at all. Therefore, the removal preventer 350 will not prevent the user to remove the article.

An embodiment similar to the above is suitable for EAS systems employing reactivatable markers. In this case, there will be at least two signals received by the EAS system from the terminal. One signal would be the verified article removal authorization signal 710, which would be used, for example, to allow a library user to remove a book from the library upon "check out." Upon receipt of this signal, the system would operate as described above, except the marker will be only temporarily deactivated. A second signal (not shown) would energize a reactivator, which would emit a suitable signal to restore a temporarily deactivated marker to active status. This would be used, for example, to allow a library user to return a book to the library upon "check in."

Regardless of the type of marker chosen, removal of articles by users determined to be authorized by the article inventory control system is accomplished by requiring an appropriate activation status signal 330 as described above.

Figure 4:
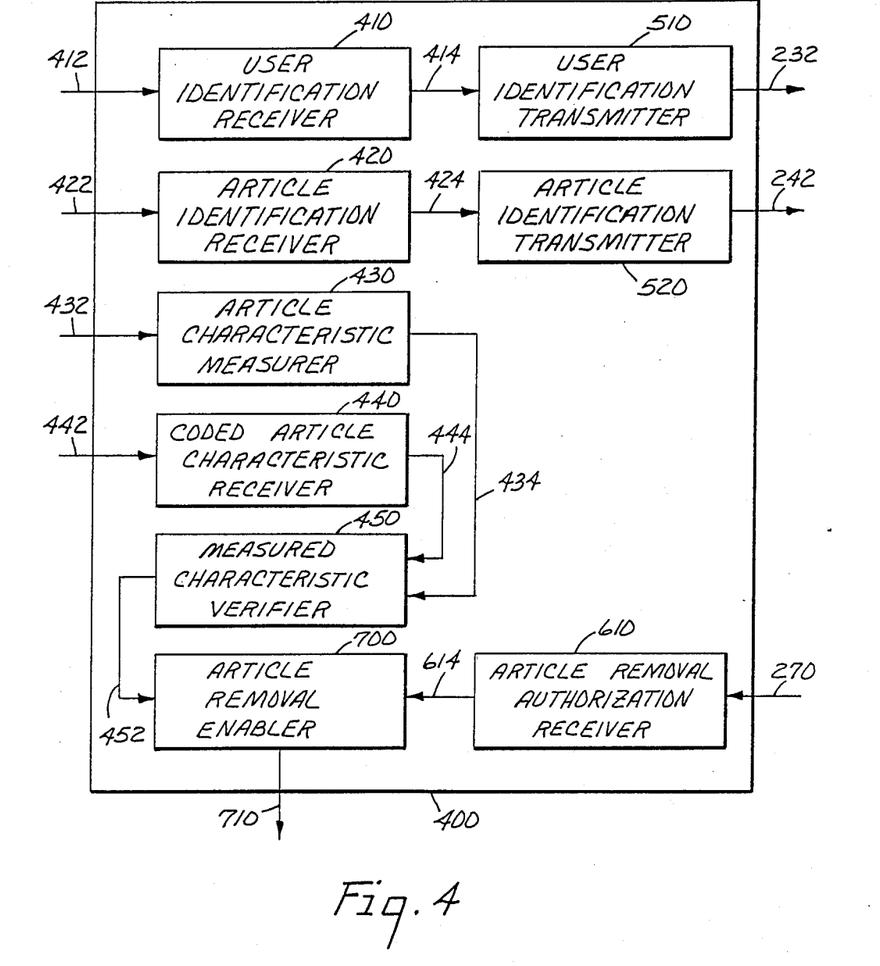
FIG. 4 is a detailed schematic block diagram of the terminal component of FIG. 1.

FIG. 4 is a schematic block diagram of the terminal 400. The terminal receives the user identification data 412, the article identification data 422, the article characteristic measurement 432, the coded article characteristic measurement 442, and the article removal authorization signal 270. The terminal sends the user identification signal 232, the article identification signal 242, and the verified article removal authorization signal 710. A user of the facility who desires to remove an article from the facility enters his or her user identification data into the terminal, e.g., by typing an identification number on an alphanumeric keypad. Similarly, the article identification data is entered into the terminal, e.g., by using an optical scanner to read a barcode on the article. A user identification receiver 410 receives the user identification data 412 and sends an internal user identification signal 414 to the user identification transmitter 510. Similarly, an article identification receiver 420 receives the article identification data 422 and sends an internal article identification signal 424 to the article identification transmitter 520. Either or both of these processes could involve a translation of the input signals 412 and 422 into a different encoding format, such as from ASCII to BCD.

The user identification transmitter 510 receives the internal user identification signal 414 and sends the transmitted user identification signal 232 to the user identifier 230 of the AIC system 200, described above (FIG. 2). Similarly, the article identification transmitter 520 receives the internal article identification signal 424 and sends the transmitted article identification signal 242 to the article identifier 240. Either or both of these processes could involve a translation of the internal signals 414 and 424 into a different encoding format, such as ASCII to BCD. It is mandatory that the user and article identification signals 232 and 242 be compatible in coding (e.g., ASCII) and form (e.g., audible tone, varying voltage level, etc.) to the signals which the AIC system is designed to accept.

The article characteristic measurement is made by an article characteristic measurer 430, which also produces a measured article characteristic signal 434. The coded article characteristic receiver 440 receives the coded article characteristic measurement 442 representing the same characteristic, but the latter is coded in a form that is not necessarily understandable to the user. For example, with a keypad as described above, the user may enter an alphanumeric or other code printed on a label attached to the article. Alternatively, if the code is in the form of a barcode, or the like, it may also be automatically entered. The code gives the value of the characteristic as measured before the article was made available for removal from the facility. In response, the terminal produces a coded article characteristic signal 444, and the measured characteristic verifier 450 compares the measured and coded signals 434 and 444 to verify that only the actual article, and not just a tag containing the article identification code 220 for example, is in fact present at the terminal. This comparison produces a characteristic verification signal 452, which is one input to an article removal enabler 700. The use of a verified measured characteristic of the article is preferred for its accuracy over non-measurement based systems such as that taught in U.S. Pat. No. 4,141,078 (Bridges, et al.), e.g., at column 6, lines 6–14.

The other input to the article removal enabler 700 is an internal article removal authorization signal 614. This signal is produced by an article removal authorization receiver 610, which receives the article removal authorization signal 270 from the article removal authorizer 250 of the AIC system 200, as described above. As with the user and article identification transmitters 510 and 520, the article removal authorization receiver 610 could translate the article removal authorization signal 270 into a different encoding format, such as from ASCII to BCD. It is likewise mandatory that the article removal authorization receiver 610 be capable of receiving and understanding the article removal authorization signal 270 which the AIC system is designed to emit, including coding (e.g., ASCII) and form (flashing light, RS-232C, 20 mA current loop, etc.).

The article removal enabler 700 performs a logical "and" function, requiring both signals 452 and 614 to be present before issuing the article removal authorization authorization signal 710 to deactivator 340 of the EAS system 300. Thus, the issuance of the signal 710 identifies to the EAS system that (1) the user is authorized to remove the article according to the article removal authorization signal 270, and (2) the article is in fact present at the terminal according to the measured characteristic verification signal 452.

In certain applications, it may be convenient to remove the user identification transmitter 510 and/or the article identification transmitter 520 from the terminal 400 and physically locate either or both near the AIC system 200. Similarly, the article authorization receiver 610 may be removed from the terminal 400 and located near the EAS system. However, it is preferred to incorporate or duplicate the deactivation and/or reactivation functions directly into the terminal 400. In this case, the article authorization receiver 610 is not removed from the terminal 400, and article removal authorization signal 710 is wholly internal to the terminal 400. However, the removal preventer 350 would still stand alone and include a duplicate interrogator/sensor 320 operating as described above.

Figures 5, 6:
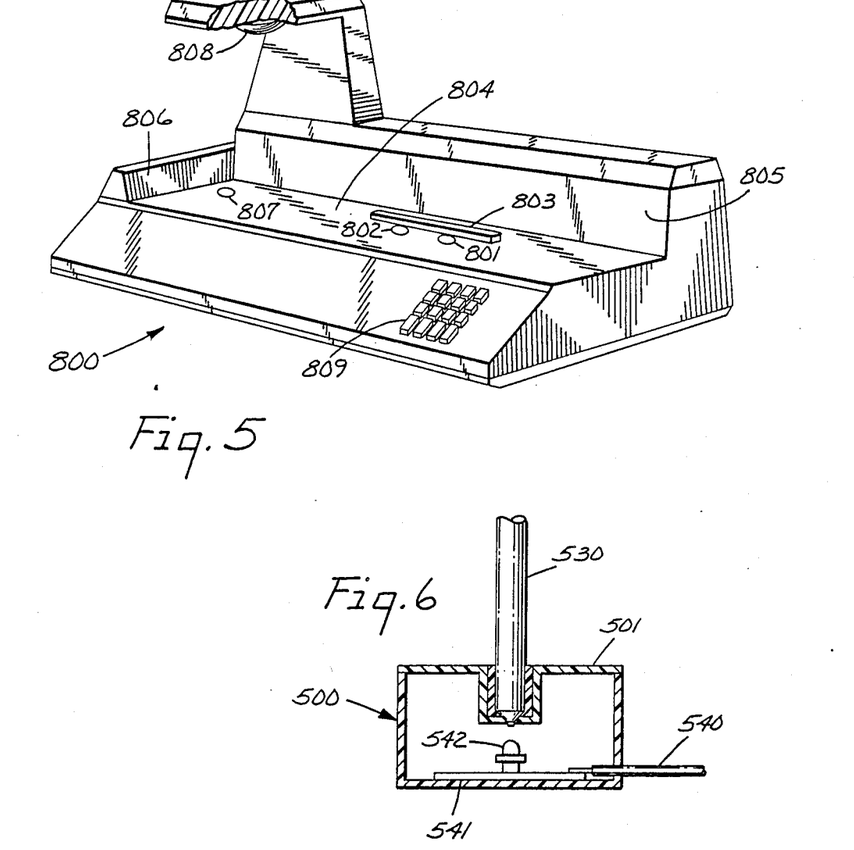
FIG. 5 is a perspective view of a preferred embodiment of the terminal component of FIG. 4.
FIG. 6 is a side cut-away view of a preferred embodiment of the transmitter component of FIG. 1.

FIG. 5 shows a preferred embodiment of the terminal suitable for use in a library. The embodiment of FIG. 5 includes the preferred configuration discussed above, in which certain interrogation, sensing, and deactivation functions of the EAS system are additionally incorporated into the terminal. In this embodiment, the article 110 is a book, map, or other member of the collection of the library; a user of the facility is typically referred to as a "patron" of the library; and the EAS system 300 typically includes as the removal preventer 350 a gate which is normally locked. Typically, the patron, carrying the book, passes through an interrogation zone immediately before exiting from the library or an individual department of the library; if the electronic article surveillance system interrogates and senses an activated marker attached to the book (i.e., the marker was not temporarily deactivated as part of the book check out procedure), the gate is held shut, thereby preventing egress, and perhaps also activating a visible or audible alarm.

In the embodiment of FIG. 5, the terminal 800 receives the user identification signal 412 by means of an optical sensor 802. The patron places an identification card flat on the book shelf 804 and against the front face of card rail 803, which holds the card in the proper orientation. The identification card, in this embodiment, has user identification data encoded on it in the form of a barcode or other means which can be optically detected. Optical sensor 801 detects the presence of the card and enables optical sensor 802. The use of two optical sensors is not required, but is preferred to ensure that ambient light does not trigger optical sensor 802 when an identification card is not present. Such triggering can cause spurious signals which may be improperly interpreted by the terminal or the AIC system. As the card is passed by the patron from right to left, the barcode on the identification card is read, and the user identification data 412 received.

The optical sensors could be replaced by devices known in the art for receiving and decoding magnetically encoded data on the identification card. A similar process of reading the encoded data would be use, such as passing the card over a "card reader" sensor built into the shelf of the terminal.

The article identification data 422 is also received by the terminal. The book is placed flat on book shelf 804 and firmly against the back rail 805. Card rail 803 is movable and spring loaded so that the book lowers it temporarily below shelf 804. The book is passed from right to left over the optical sensors 801 and 802 until it lies in the corner formed by the book shelf 804, the back rail 805, and the side rail 806, thereby covering optical sensor 807. This embodiment requires that the article identification code 220 be attached to the book in a position which will enable the barcode on the marker to be read by optical sensor 802 when the book is held flat on the book shelf 804.

If the optical sensors are replaced by devices known in the art for receiving and decoding magnetically encoded data on the identification card, as described above, and it is desired to use the same device for receiving the article identification data 422 as the user identification data 412, the article identification code 220 also must be magnetically encoded. However, it is not necessary that the user and article identification receivers 410 and 420 be identical.

When the book is passed completely from right to left, it covers optical sensor 807, which activates the characteristic measuring component 808. The terminal monitors optical sensor 807 and aborts the checkout process if the book is removed. In this position, the book is suitably positioned to allow the terminal to measure a characteristic of the book. In the preferred embodiment shown, the characteristic measured is the thickness of the book along the dimension perpendicular to the book shelf. The preferred means for measuring thickness is an ultrasonic ranging measurement of the distance from the characteristic measuring component 808 and the book. A preferred means for ultrasonic ranging is available from the Polaroid Company and is identified as "OEM Ranging Kit" with product code IP44491. Following the directions provided with this product, the ultrasonic ranging means is adjusted to measure within ±1.6 millimeters over a range of 11.5 to 25 centimeters.

Subtraction of the distance between the characteristic measuring component 808 and the book, from the known distance between the same point and the book shelf 804, yields the thickness of the book. In the preferred embodiment, this thickness, pre-measured before the book was placed in circulation, is coded into a hexadecimal value and attached to the book so that the user may read it as article characteristic code 460. The user enters the hexadecimal code by means of the user declaration keypad 809. This embodiment is preferred as it requires interaction between the patron and the system, which is believed to increase the security of the entire system. The terminal thus receives measured and entered values of the same characteristic.

The terminal then compares the measured and entered values of the characteristic, and if the two agree (within acceptable tolerances), the terminal concludes that only the specifically identified book is present at the terminal, and issues characteristic verification signal 452. If only the barcode were passed across the optical sensor 802, or if more than one book were stacked beneath the characteristic measuring component 808, the measured thickness of the book would not agree with the coded measurement entered by the user.

Another suitable characteristic is the weight of the article. In this embodiment, the terminal would incorporate a scale to produce the measured characteristic, and compare this value to a pre-coded, user-entered weight measurement as described above.

The preferred embodiment of the terminal shown in FIG. 5 utilizes user and article identification transmitters 510 and 520 which are physically separated from the terminal, and also a physically separated article removal authorization receiver 610, as described above. Thus, the terminal passes the user identification signal 414 and the article identification signal 424 to the transmitters 510 and 520 using any means known in the art, typically common wire. As described above, if the article inventory control system authorizes the removal of the book from the library, the terminal receives the authorization signal 614 from the receiver 610. This too may be received through any means known in the art.

FIG. 6 is a side cut-away view of a preferred embodiment of an optical transmitter 500, which incorporates the functions of both the user and article identification transmitters 510 and 520. This embodiment is suitable for AIC systems which employ a barcode reader 530 as an element of both the user identifier 230 and the article identifier 240. The optical transmitter is connected with the terminal 800 by a common cable 540 which carries user identification signal 414 and article identification signal 424 through any convenient signal transmission means. Cable 540 terminates on circuit board 541, which includes light emitting diode (LED) 542. Cover 501 is preferably designed to hold barcode wand 530 in close proximity to LED 542.

The circuit of circuit board 541 is designed to replicate, by flashing LED 542, the barcode signal detected by optical sensor 802. Thus, the barcode wand 530 receives the same user and article identification data 412 and 422, in the same form, as if the barcode wand 530 had been physically present in the terminal 800 at the location of optical sensor 802. A preferred circuit is described in Application Note 1008 (published by the Hewlett-Packard Company in January 1981), modified to operate on a 5 vdc power supply and use a LED as the output device instead of a direct wired connection to a barcode circuit. This circuit is effective for use with the barcode wand 530 of a model 9410B Portable Bar Code Reader supplied by the Interface Mechanisms Company. The optical sensor 802 is preferably a model HBCS-1100, and the LED 542 is preferably a model HEMT-6000, both supplied by the Hewlett-Packard Company. Other models of barcode reader may require other similar circuits and/or modifications.

Figure 7:
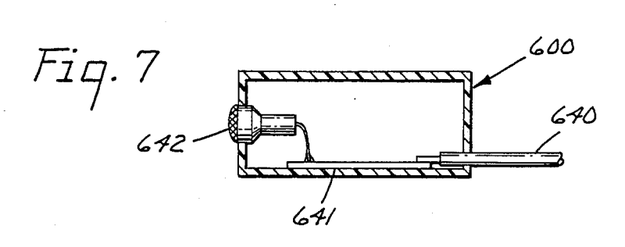
FIG. 7 is a side cut-away view of a preferred embodiment of the receiver component of FIG. 1.

FIG. 7 is a side cut-away view of a preferred embodiment of an audio receiver 600, which incorporates the functions of the article authorization receiver 610. This embodiment is suitable for AIC systems which employ an audio generator (not shown) as an element of the authorization signal producer 260. Such a generator would typically produce an audible tone in which is encoded in some manner the article removal authorization signal 270. The encoding method could involve one or more frequencies, or the duration of the audio signal, or some combination. FIG. 7 also shows cable 640, which carries received removal authorization signal 270 through any convenient signal transmission means. The cable 640 terminates on circuit board 641, and connects the audio receiver with the terminal 800.

The circuit of circuit board 641 preferably is designed to produce a voltage pulse whenever an audible signal is detected by microphone 642. Thus, if the terminal is adapted to receive this voltage pulse, it operates as if the authorization signal producer 260, which produced the audible tone, is directly connected to it. A preferred design incorporates a frequency-sensitive circuit, known in the art as a "bi-quad" RC active bandpass filter, tuned to the specific audible signal produced by authorization signal producer 260. Typically, this audible signal is between 0.9 and 4.0 kHz. A preferred microphone is model MC1606 supplied by the Armaco Company. It is useful to use a parabolic reflector in conjunction with the microphone to focus the microphone in the direction of the audible signal source of the AIC system. Other frequency sensitive circuits and components may be suitable for other audible signals.

While certain representative embodiments and details have been shown to illustrate this invention, it will be apparent to those skilled in this art that various changes and modifications may be made in this invention without departing from its true spirit or scope, which is indicated by the following claims.

I claim:
1. An article removal control system for enabling removal of a given article only by a given authorized user from a facility which has:
 (a) an article inventory control system which responds to inputs including user identification data and article identification data to issue an article removal authorization signal, and
 (b) an electronic article surveillance system which controls removal of the article by detecting within an interrogation zone a sensitized electronically detectable marker secured to the article;
the article removal control system comprising:
 (c) an article removal authorization signal receiver and
 (d) means responsive to the article removal authorization signal for initiating removal of the given article, comprising
  (1) a measurer of a characteristic of the given article,
  (2) a receiver of a coded input signal representing the measured characteristic,
  (3) a comparer of the measured characteristic and the coded input signal, which produces a verification signal if they are substantially equal, and

(4) an enabler which upon receipt of the verification signal enables the initiation of the removal of the given article.

2. A system according to claim 1, further comprising a terminal comprising user and article identification data receivers, and transmitters of both data as inputs to the article inventory control system.

3. The system of claim 2, in which the the article authorization removal signal receiver is remote from and coupled to the terminal.

4. The system of claim 2, in which the coded input signal receiver is responsive to user input.

5. The system of claim 4, in which the coded input signal receiver comprises a keypad.

6. The system of claim 2, in which the terminal further comprises a marker interrogator and sensor.

7. The system of claim 2, in which the terminal further comprises a marker deactivator.

8. The system of claim 7, in which the terminal further comprises a marker reactivator.

9. The system of claim 1 in which at least one user and article identification data transmitter is remote from and coupled to the terminal.

10. The system of claim 9, in which at least one remote transmitter provides user identification data in a form suitable for reading by bar code scanners of the article inventory control system.

11. The system of claim 9, in which at least one remote transmitter provides article identification data in a form suitable for reading by bar code scanners of the article inventory control system.

12. The system of claim 1, in which the characteristic measured is the thickness of the article.

13. The system of claim 12, in which the characteristic measurer comprises an ultrasonic ranger.

14. The system of claim 1, in which the article removal authorization signal is a sound-encoded signal of the article inventory control system.

* * * * *

UNITED STATES PATENT AND TRADEMARK OFFICE
CERTIFICATE OF CORRECTION

PATENT NO.   :   4,881,061

DATED        :   November 14, 1989

INVENTOR(S)  :   David C. Chambers

It is certified that error appears in the above-identified patent and that said Letters Patent is hereby corrected as shown below:

Designation of Inventor: "David C. Chambers, Saint Paul, Minn." should read --David C. Chambers, Ilderton, Ontario, Canada--

Column 4, line 31: "user 120" should read --user--

Column 5, line 53: "34" should read --342--

Column 7, lines 28-29: "authorization authorization" should read: --authorization --

Column 8, line 24: "use" should read --used--

Signed and Sealed this

Eleventh Day of June, 1991

Attest:

HARRY F. MANBECK, JR.

Attesting Officer

Commissioner of Patents and Trademarks